(12) United States Patent
King et al.

(10) Patent No.: US 7,489,093 B2
(45) Date of Patent: Feb. 10, 2009

(54) METHOD AND APPARATUS FOR PRODUCING TRACTIVE EFFORT

(75) Inventors: Robert Dean King, Schenectady, NY (US); Lembit Salasoo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1163 days.

(21) Appl. No.: 10/723,572

(22) Filed: Nov. 25, 2003

(65) Prior Publication Data

US 2005/0122071 A1 Jun. 9, 2005

(51) Int. Cl.
H02P 1/54 (2006.01)
H02P 5/00 (2006.01)
H02P 5/46 (2006.01)

(52) U.S. Cl. .................. 318/109; 318/442

(58) Field of Classification Search .......... 318/109, 318/442
See application file for complete search history.

(56) References Cited

U.S. PATENT DOCUMENTS

| | | | |
|---|---|---|---|
| 5,589,743 A | 12/1996 | King | |
| 5,780,980 A | 7/1998 | Naito | |
| 6,323,608 B1 | 11/2001 | Ozawa | |
| 2002/0158606 A1 | 10/2002 | King | |

FOREIGN PATENT DOCUMENTS

JP 07231511 8/1995

OTHER PUBLICATIONS

PCT Search Report, RD 133987, Apr. 28, 2005.

*Primary Examiner*—Rina I Duda
*Assistant Examiner*—Erick Glass
(74) *Attorney, Agent, or Firm*—Shawn A. McClintic (57) ABSTRACT

An apparatus for producing tractive effort, the apparatus comprising: an energy source adapted for generating a high DC voltage; a motor drive adapted for generating a motor voltage from the high DC voltage; and a motor adapted for producing the tractive effort from the motor voltage, the energy source comprising: a heat engine adapted for generating mechanical power by burning a fuel; an alternator adapted for generating an alternating voltage from the mechanical power; a rectifier adapted for rectifying the alternating voltage and producing a low DC voltage; an energy battery adapted for storing and delivering energy derived from the low DC voltage; and a traction boost converter adapted for boosting the low DC voltage to produce the high DC voltage, the motor drive comprising: a power battery adapted for storing energy and delivering power at the high DC voltage; and a traction converter adapted for generating the motor voltage from the high DC voltage during motoring operation and for generating the high DC voltage from the motor voltage during braking operation.

38 Claims, 11 Drawing Sheets

METHOD AND APPARATUS FOR PRODUCING TRACTIVE EFFORT

BACKGROUND

The present invention relates generally to electric traction systems and more specifically to the use of energy batteries and power batteries in combination for producing tractive effort and for non-traction purposes. While this disclosure emphasizes the use of electric traction systems in locomotives and off-highway vehicles, it will be obvious to one of ordinary skill in the art that the instant invention is useful in other vehicular and non-vehicular applications as well.

In a wide variety of applications, electric traction systems include electric batteries to improve system efficiency. These batteries are typically classified as either "energy batteries" or "power batteries" depending on whether their designs are optimized for energy density or power density, respectively. Some traction applications favor one battery class over the other; other applications favor a combination of both energy and power batteries. During motoring operation, the batteries are discharged through electric motors to produce tractive effort. During braking operation, the motors are operated as generators to re-charge the batteries.

In systems incorporating both energy and power batteries (dual battery systems), initial and supplemental charging of the energy batteries are typically achieved either mechanically, by replacing parts of the battery, or electrically by coupling to the power utility grid. An opportunity exists, to provide an alternative means of charging energy batteries in dual battery systems.

In addition to providing power for the traction application, the traction system's electrical power production capability can be used for non-traction purposes. Additional opportunities exist, therefore, to exploit the electrical power production capability of electric traction systems for non-traction applications.

SUMMARY

The opportunities described above are addressed, in one embodiment of the present invention, by an apparatus for producing tractive effort, the apparatus comprising: an energy source adapted for generating a high DC (direct current) voltage; a motor drive adapted for generating a motor voltage from the high DC voltage; and a motor adapted for producing the tractive effort from the motor voltage, the energy source comprising: a heat engine adapted for generating mechanical power by burning a fuel; an alternator adapted for generating an alternating voltage from the mechanical power; a rectifier adapted for rectifying the alternating voltage and producing a low DC voltage; an energy battery adapted for storing and delivering energy derived from the low DC voltage; and a traction boost converter adapted for boosting the low DC voltage to produce the high DC voltage, the motor drive comprising: a power battery adapted for storing energy and delivering power at the high DC voltage; and a traction converter adapted for generating the motor voltage from the high DC voltage during motoring operation and for generating the high DC voltage from the motor voltage during braking operation.

The present invention is also embodied as a method comprising the acts of: generating a high DC voltage; generating a motor voltage from the high DC voltage; and producing the tractive effort from the motor voltage, the act of generating the high DC voltage comprising: burning a fuel to generate mechanical power; generating an alternating voltage from the mechanical power using an alternator; rectifying the alternating voltage to produce a low DC voltage using a rectifier; storing and delivering energy derived from the low DC voltage using an energy battery; and boosting the low DC voltage to produce the high DC voltage, the act of generating a motor voltage comprising: storing energy and delivering power at the high DC voltage using a power battery; and generating the motor voltage from the high DC voltage during motoring operation and generating the high DC voltage from the motor voltage during braking operation.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
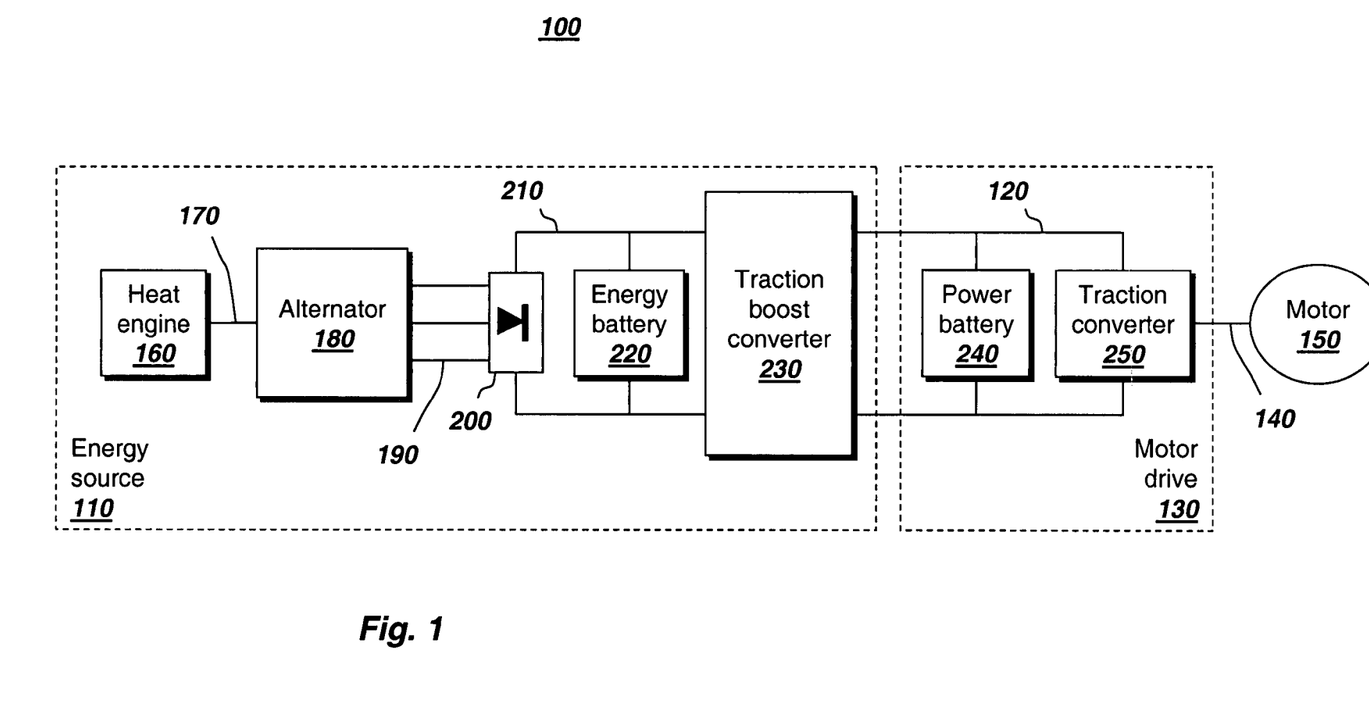
FIG. 1 illustrates a block diagram of an apparatus for producing tractive effort in accordance with one embodiment of the present invention.

In accordance with one embodiment of the present invention, FIG. 1 illustrates a block diagram of an apparatus 100 for producing tractive effort. Apparatus 100 comprises an energy source 110, a motor drive 130, and a motor 150. In operation, energy source 110 generates a high DC voltage 120. Motor drive 130 generates a motor voltage 140 from high DC voltage 120, and motor 150 produces tractive effort from motor voltage 140. As used herein, motor 150 refers to any electrical apparatus capable of producing mechanical power from electrical power including, without limitation, single phase or multiple phase, AC (alternating current) or DC motors.

In the embodiment of FIG. 1, energy source 110 comprises a heat engine 160, an alternator 180, a rectifier 200, an energy battery 220, and a traction boost converter 230. In operation, heat engine 160 generates mechanical power 170 by burning a fuel. Alternator 180 generates an alternating voltage 190 from mechanical power 170. Rectifier 200 then rectifies alternating voltage 190 to produce a low DC voltage 210. Energy battery 220 stores and delivers energy derived from low DC voltage 210, and traction boost converter 230 boosts low DC voltage 210 to produce high DC voltage 120. As used herein in reference to DC voltages, "low" and "high" are relative terms only and imply no particular absolute voltage levels.

Motor drive 130 comprises a power battery 240 and a traction converter 250. In operation, power battery 240 stores energy and delivers power at high DC voltage 120. Traction converter 250 generates motor voltage 140 from high DC voltage 120 during motoring operation and generates high DC voltage 120 from motor voltage 140 during braking operation.

In a more detailed embodiment in accordance with the embodiment of FIG. 1, a ratio of the energy storage capacity of motor drive 130 to the power delivered by energy source 110 at high DC voltage 120 is between about 0.001 hours and about 60 hours.

In another more detailed embodiment in accordance with the embodiment of FIG. 1, a ratio of the energy storage capacity of motor drive 130 to the power delivered by energy source 110 at high DC voltage 120 is between about 0.5 hours and about 20 hours.

Figure 2:
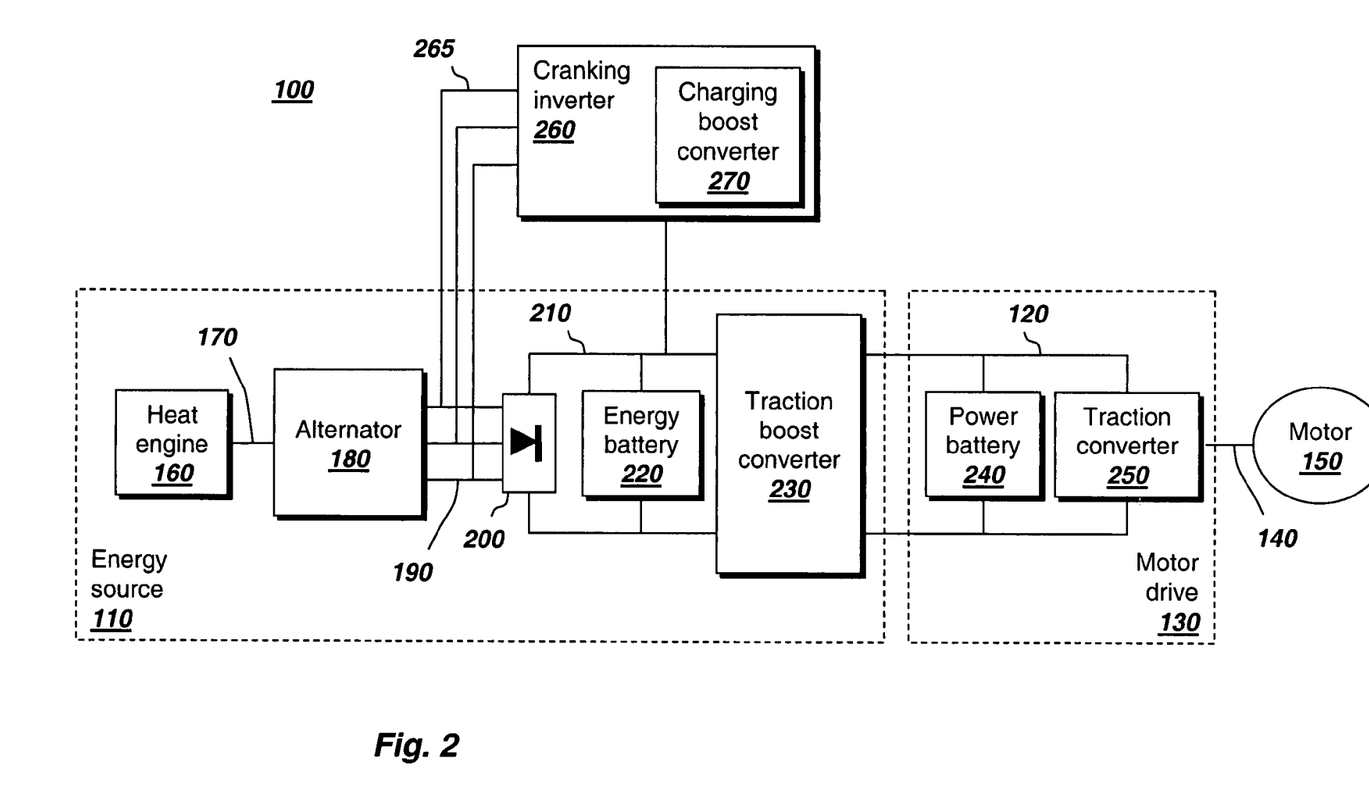
FIGS. 2-9 illustrate block diagrams of other embodiments in accordance with the embodiment of FIG. 1.

In accordance with another embodiment of the present invention, FIG. 2 illustrates a block diagram wherein apparatus 100 further comprises a cranking inverter 260. In operation, cranking inverter 260 generates a cranking voltage 265 from low DC voltage 210 during cranking operation of alternator 180. "Cranking operation" refers to the practice of using alternator 180 as a motor to apply torque for starting heat engine 160.

In a more detailed embodiment in accordance with the embodiment of FIG. 2, cranking inverter 260 is bi-directional and further comprises a charging boost converter 270. In operation, charging boost converter 270 boosts alternating voltage 190 to a higher voltage more suitable for charging energy battery 220.

Figure 3:
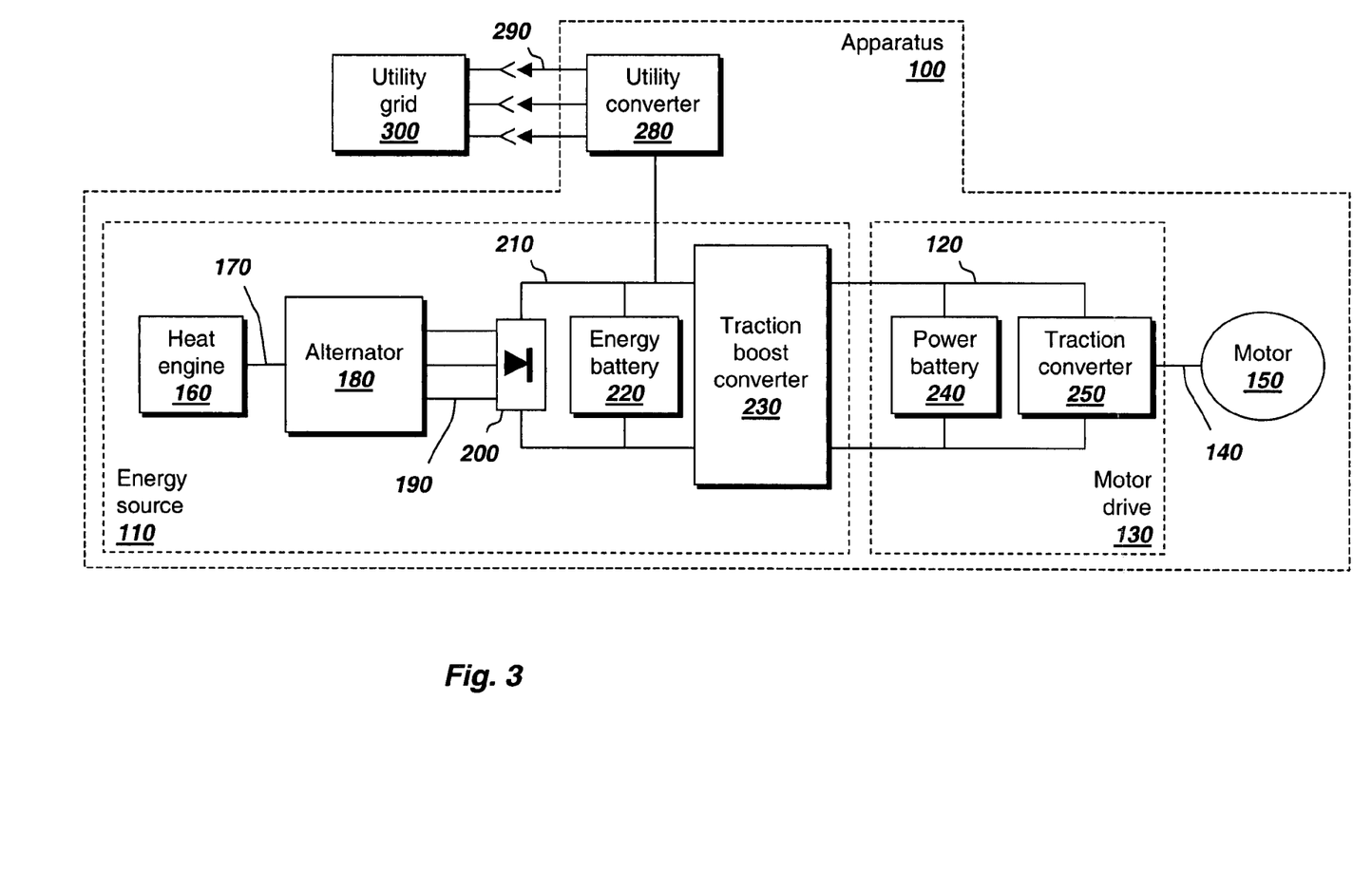

In accordance with another embodiment of the present invention, FIG. 3 illustrates a block diagram wherein apparatus 100 further comprises a utility converter 280. In operation, utility converter 280 serves as an emergency generator converting low DC voltage 210 to a utility voltage 290 suitable for coupling to a utility grid 300. In some embodiments, converter 280 is a bi-directional device selectively allowing charging of energy battery 220 directly from utility grid 300.

Figure 4:
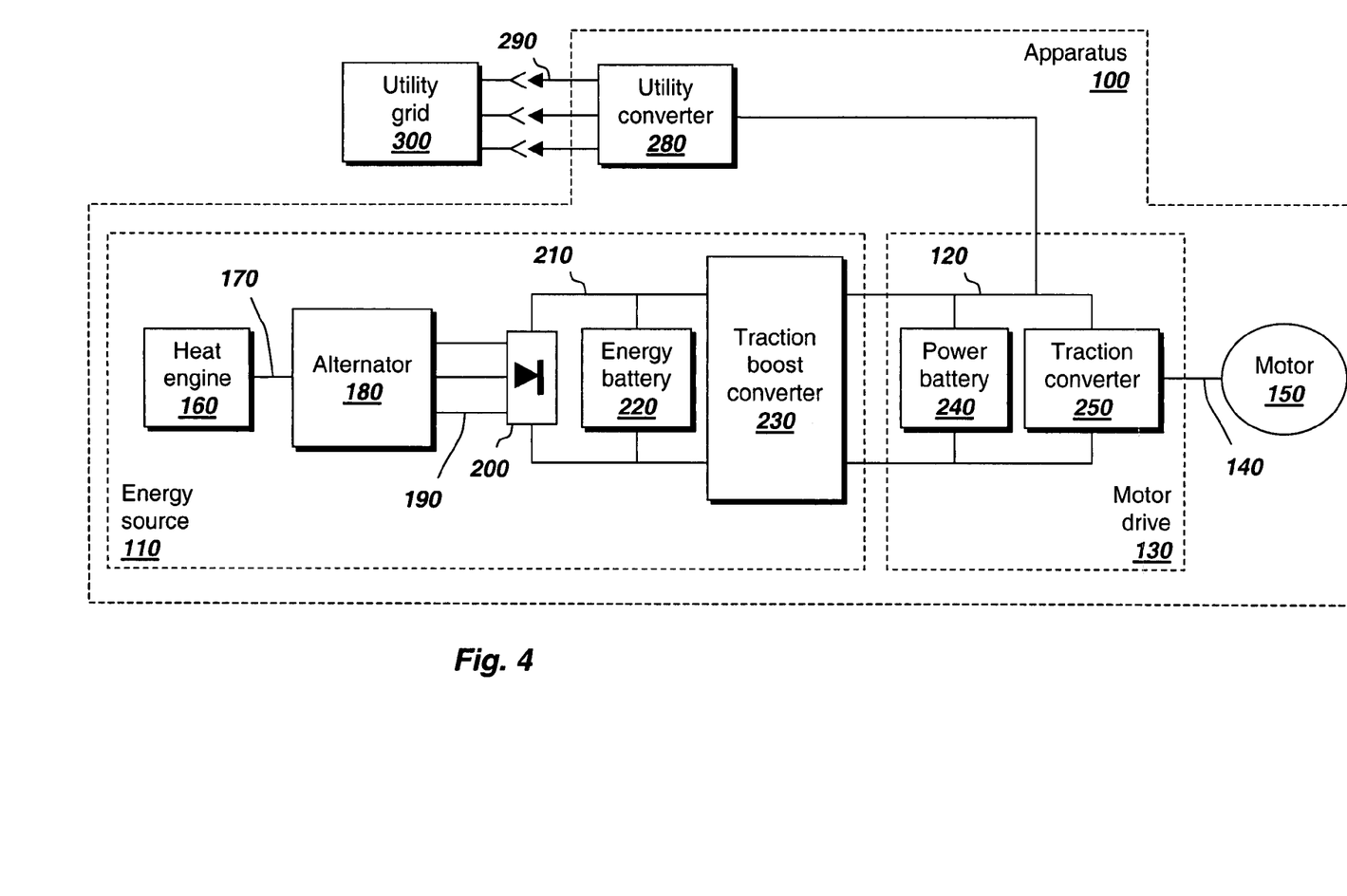

In an alternative embodiment, shown in FIG. 4, utility converter 280 is fed from high DC voltage 120 instead of from low DC voltage 210. In some embodiments, converter 280 is a bi-directional device selectively allowing charging of power battery 240 directly from utility grid 300.

Figure 5:
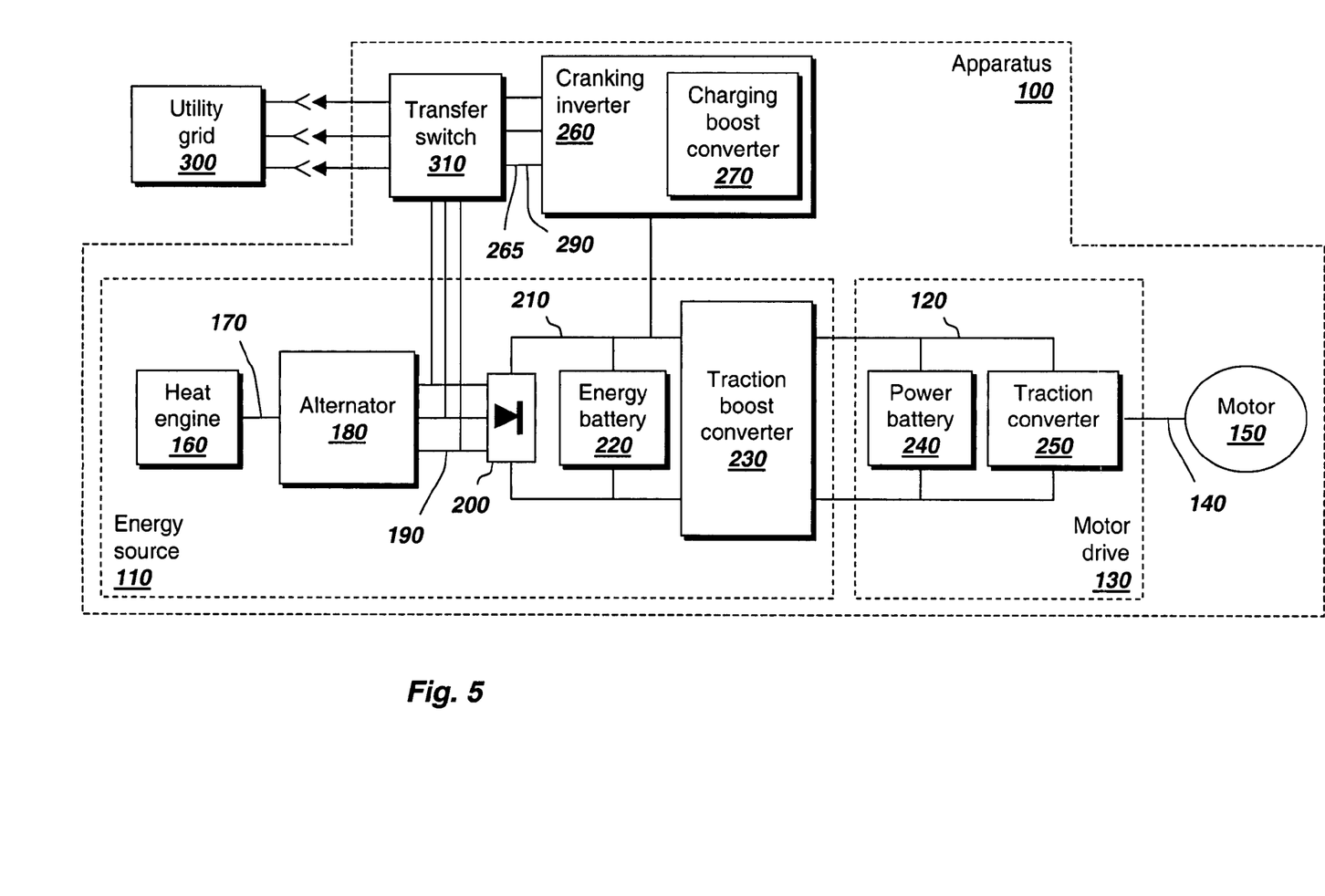

In accordance with another embodiment of the present invention, FIG. 5 illustrates a block diagram wherein apparatus 100 further comprises a cranking inverter 260 and a transfer switch 310. In operation, cranking inverter 260 selectively generates a cranking voltage 265 or a utility voltage 290 from low DC voltage 210. Transfer switch 310 selectively couples cranking voltage 265 to alternator 180 or utility voltage 290 to utility grid 300.

Figure 6:
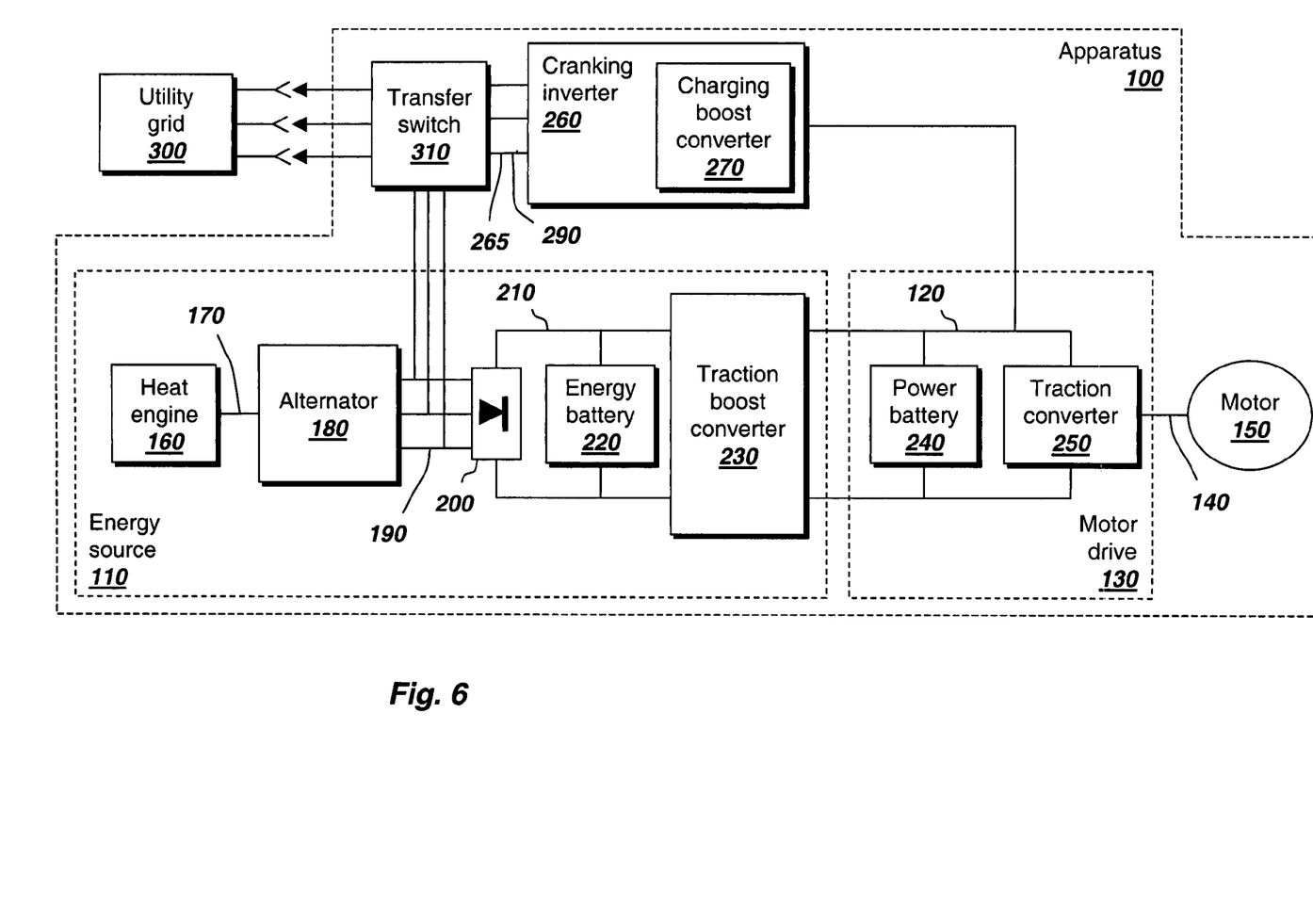

In a more detailed embodiment in accordance with the embodiment of FIG. 5, cranking inverter 260 is bi-directional and comprises a charging boost converter 270. In operation, charging boost converter 270 boosts alternating voltage 190 to a higher voltage more suitable for charging energy battery 220. In an alternative embodiment, shown in FIG. 6, cranking inverter 260 is fed from high DC voltage 120 instead of from low DC voltage 210 and may be used to charge power battery 240.

Figure 7:
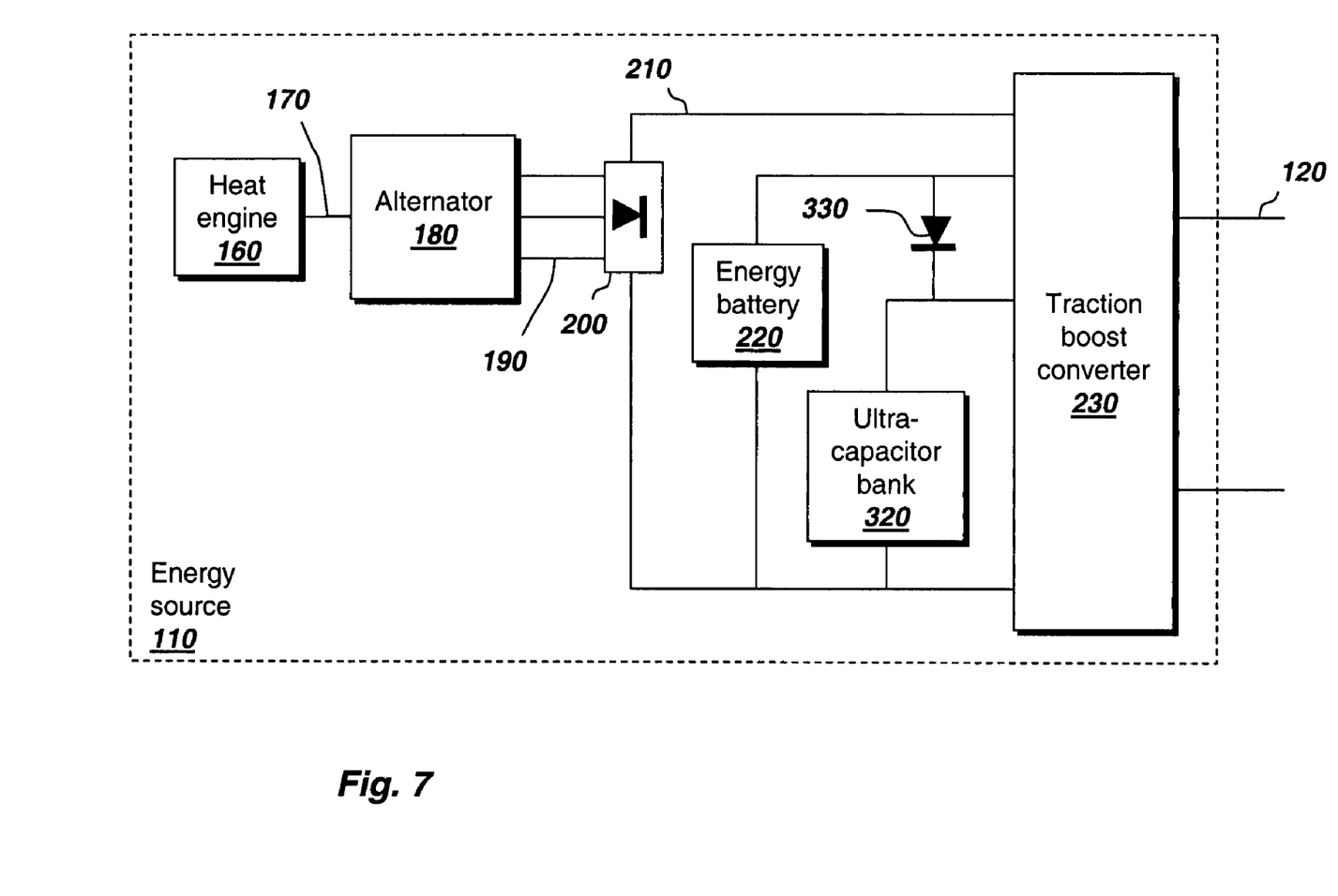

In another embodiment in accordance with the embodiment of FIG. 1, FIG. 7 illustrates a block diagram wherein energy source 110 further comprises an ultra capacitor bank 320. In operation, ultra capacitor bank 320 stores and delivers electrical energy. In this embodiment, traction boost converter 230 performs the additional function of controlling energy flows among rectifier 200, energy battery 220, and ultra capacitor bank 320.

In another embodiment in accordance with FIG. 7, energy source 110 further comprises a unidirectional coupler 330. In operation, unidirectional coupler 330 conducts current from energy battery 220 to ultra capacitor bank 320 when the voltage of ultra capacitor bank 320 is lower than the voltage of energy battery 220.

Figure 8:
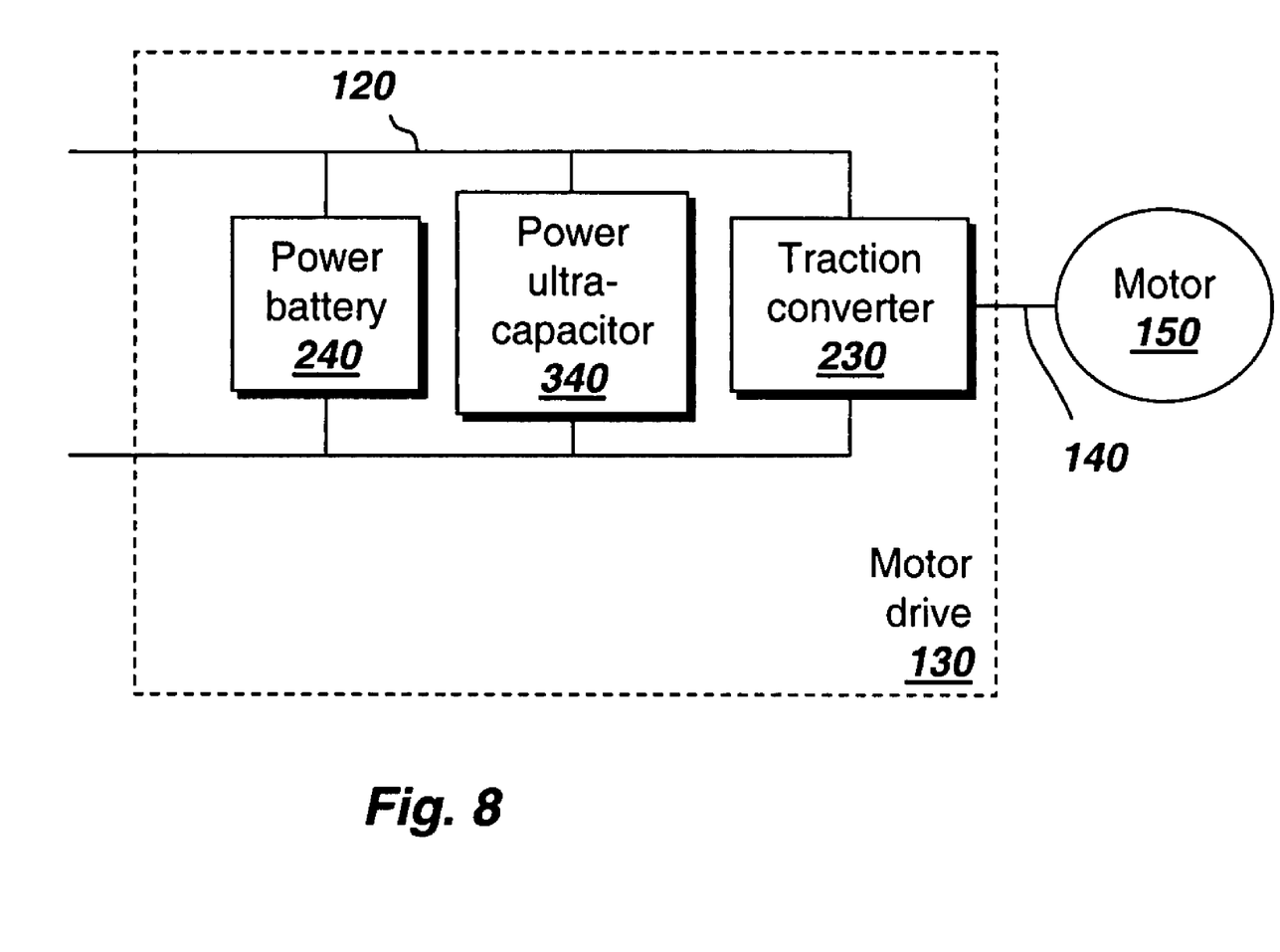

In another embodiment in accordance with FIG. 1, FIG. 8 illustrates a block diagram wherein motor drive 130 further comprises a power ultra capacitor 340. In operation, power ultra capacitor 340 stores and delivers energy derived from high DC voltage 120.

In another more detailed embodiment in accordance with the embodiment of FIG. 1, motor voltage 140 is a DC voltage and motor 150 comprises a DC motor.

Figure 9:
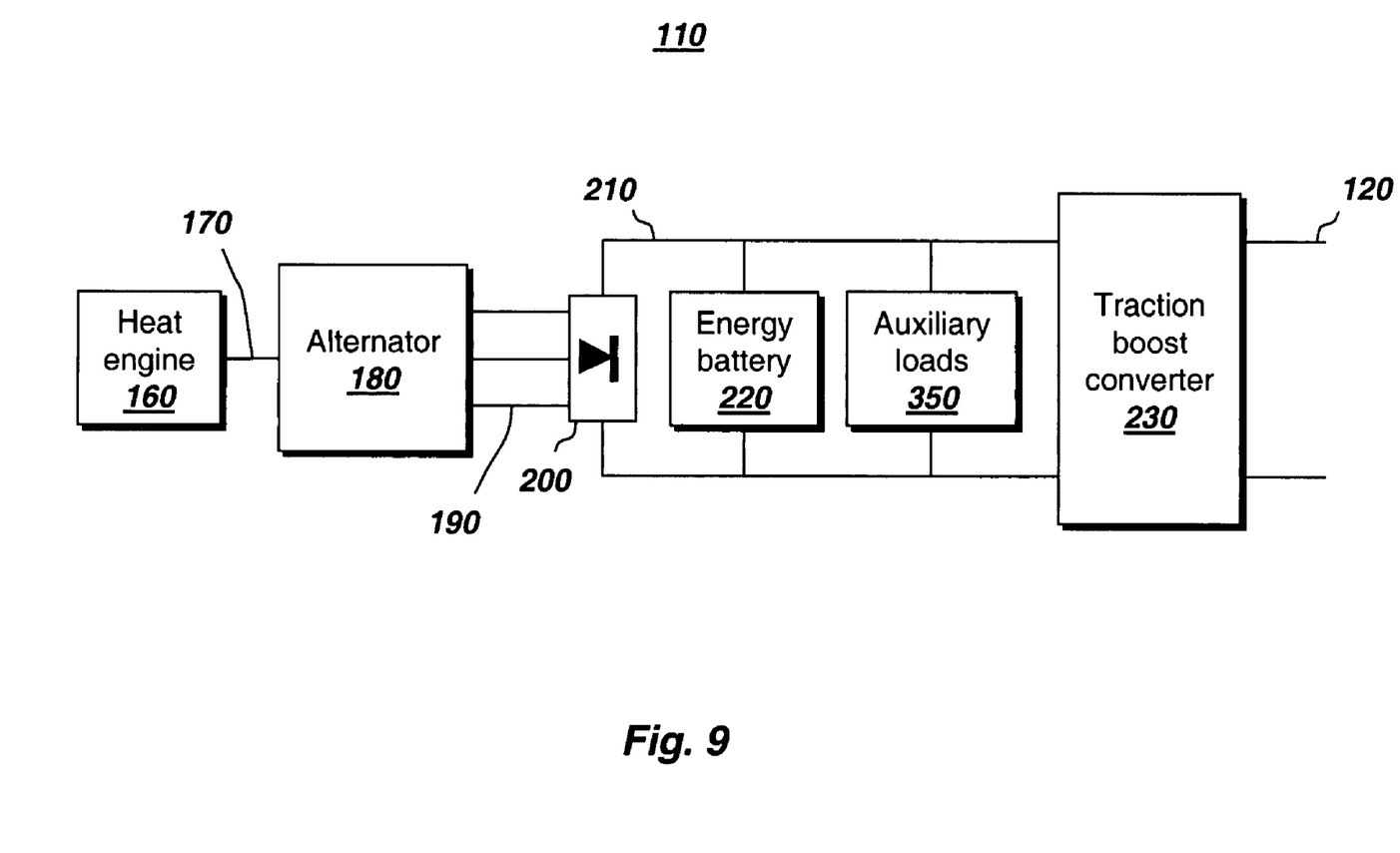

In another more detailed embodiment in accordance with the embodiment of FIG. 1, FIG. 9 illustrates a block diagram wherein alternator 180 and rectifier 200 are further adapted for supplying power to auxiliary loads 350 and thus serve as an auxiliary power unit.

Figure 10:
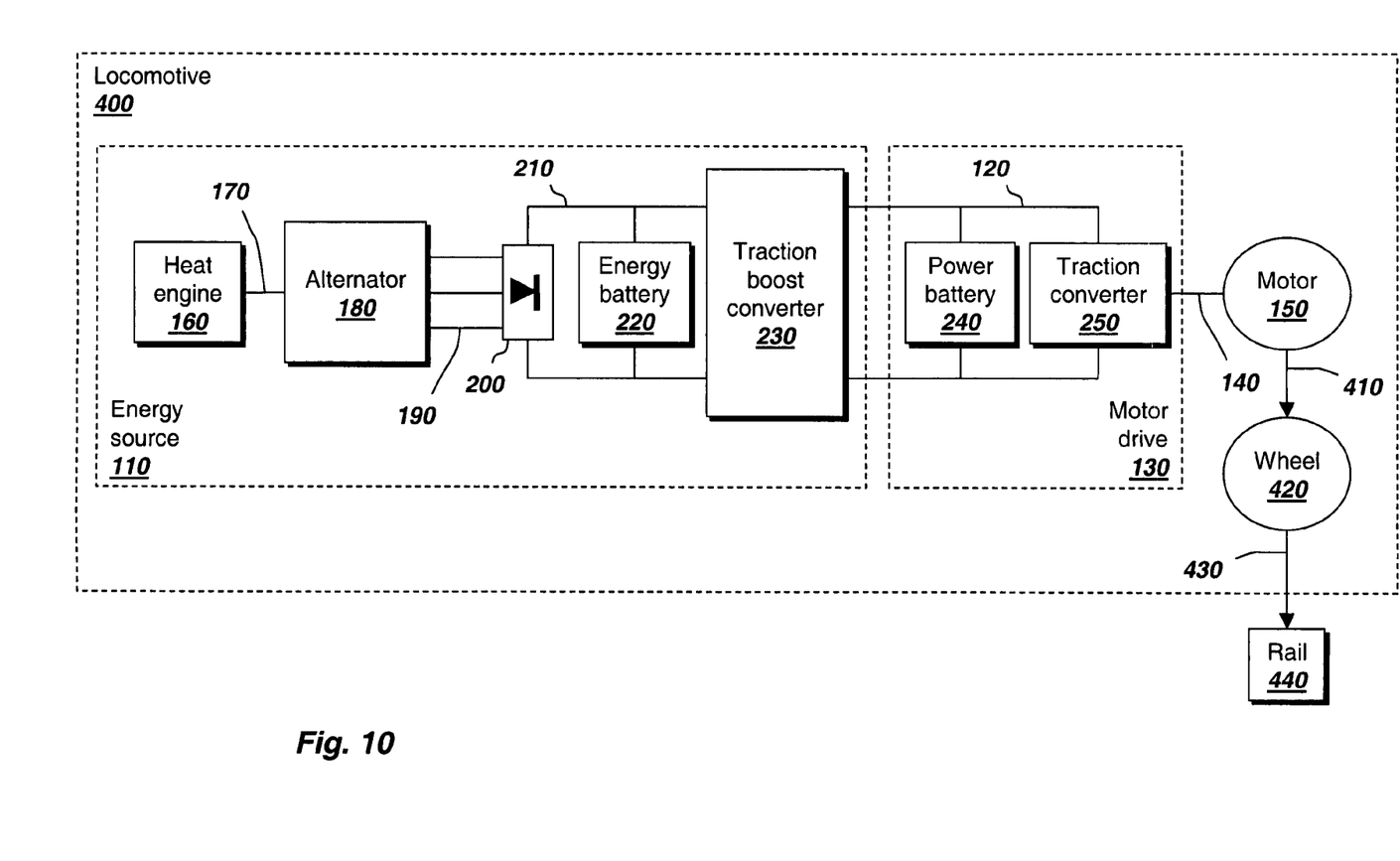
FIG. 10 illustrates a block diagram of a locomotive in accordance with another embodiment of the present invention.

In accordance with another embodiment of the present invention, FIG. 10 illustrates a block diagram of a locomotive 400. In addition to the components of apparatus 100, locomotive 400 comprises a wheel 420. In this embodiment, motor 150 produces a motor torque 410 from motor voltage 140. Wheel 420 produces tractive effort 430 from motor torque 410 and applies tractive effort 430 to a rail 440.

Figure 11:
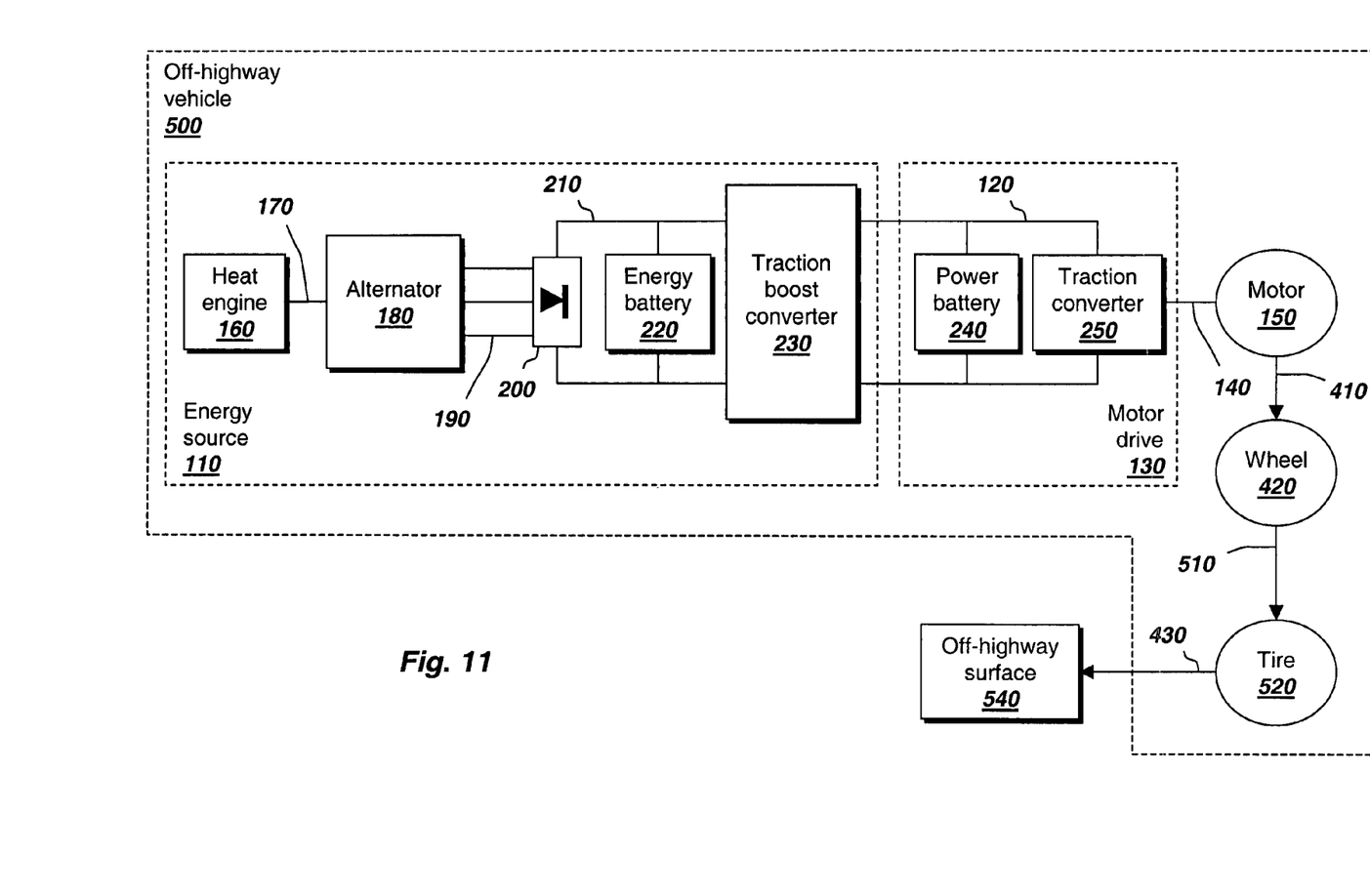
FIG. 11 illustrates a block diagram of an off-highway vehicle in accordance with another embodiment of the present invention.

In accordance with another embodiment of the present invention, FIG. 11 illustrates a block diagram of an off-highway vehicle 500. In addition to the components of locomotive 400, off-highway vehicle 500 comprises a tire 520. In this embodiment, wheel 420 produces a wheel torque 510 from motor torque 410. Tire 520 produces tractive effort 430 from wheel torque 510 and applies tractive effort 430 to an off-highway surface 540.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An apparatus for producing tractive effort, said apparatus comprising:
   an energy source adapted for generating a high DC voltage;
   a motor drive adapted for generating a motor voltage from said high DC voltage; and
   a motor adapted for producing said tractive effort from said motor voltage,
   said energy source comprising:
   a heat engine adapted for generating mechanical power by burning a fuel;
   an alternator adapted for generating an alternating voltage from said mechanical power;
   a rectifier adapted for rectifying said alternating voltage and producing a low DC voltage;
   an energy battery adapted for storing and delivering energy derived from said low DC voltage; and
   a traction boost converter adapted for boosting said low DC voltage to produce said high DC voltage,
   said motor drive comprising:
   a power battery adapted for storing energy and delivering power at said high DC voltage; and
   a traction converter adapted for generating said motor voltage from said high DC voltage during motoring operation and for generating said high DC voltage from said motor voltage during braking operation;
   wherein a ratio of the energy storage capacity of said motor drive to the power delivered by said energy source at said high DC voltage is between 0.001 hours and 60 hours.

2. The apparatus of claim 1 wherein a ratio of the energy storage capacity of said motor drive to the power delivered by said energy source at said high DC voltage is between 0.5 hours and 20 hours.

3. The apparatus of claim 1 further comprising a cranking inverter adapted for generating a cranking voltage from said low DC voltage during cranking operation of said alternator.

4. The apparatus of claim 3 wherein said cranking inverter is bi-directional and further comprises a charging boost converter adapted for boosting said alternating voltage.

5. The apparatus of claim 1 further comprising a utility converter adapted for converting said low DC voltage to a utility voltage.

6. The apparatus of claim 5 wherein said utility converter is further adapted for selectively converting said utility voltage to said low DC voltage.

7. The apparatus of claim 1 further comprising a utility converter adapted for converting said high DC voltage to a utility voltage.

8. The apparatus of claim 7 wherein said utility converter is further adapted for selectively converting said utility voltage to said high DC voltage.

9. The apparatus of claim 1 further comprising:
a cranking inverter adapted for selectively generating a cranking voltage or a utility voltage from said low DC voltage; and
a transfer switch adapted for selectively coupling said cranking voltage to said alternator or said utility voltage to a utility grid.

10. The apparatus of claim 9 wherein said cranking inverter is bi-directional and further comprises a charging boost converter adapted for boosting said alternating voltage.

11. The apparatus of claim 1 further comprising:
a cranking inverter adapted for selectively generating a cranking voltage or a utility voltage from said high DC voltage; and
a transfer switch adapted for selectively coupling said cranking voltage to said alternator or said utility voltage to a utility grid.

12. The apparatus of claim 1 wherein said energy source further comprises an ultracapacitor bank adapted for storing and delivering electrical energy, said traction boost converter being further adapted for controlling energy flows among said rectifier, said energy battery, and said ultracapacitor bank.

13. The apparatus of claim 12 further comprising a unidirectional coupler adapted for conducting current from said energy battery to said ultracapacitor bank.

14. The apparatus of claim 1 wherein said motor drive further comprises a power ultracapacitor adapted for storing and delivering energy derived from said high DC voltage.

15. The apparatus of claim 1 wherein said motor voltage is a DC voltage.

16. The apparatus of claim 1 wherein said alternator and said rectifier are further adapted for supplying power to auxiliary loads.

17. A method for producing tractive effort, said method comprising:
generating a high DC voltage;
generating a motor voltage from said high DC voltage; and
producing said tractive effort from said motor voltage,
said act of generating said high DC voltage comprising:
burning a fuel to generate mechanical power;
generating an alternating voltage from said mechanical power using an alternator;
rectifying said alternating voltage to produce a low DC voltage using a rectifier;
storing and delivering energy derived from said low DC voltage using an energy battery; and
boosting said low DC voltage to produce said high DC voltage,
said act of generating a motor voltage comprising:
storing energy and delivering power at said high DC voltage using a power battery; and
generating said motor voltage from said high DC voltage during motoring operation and generating said high DC voltage from said motor voltage during braking operation;
wherein a ratio of the energy storage capacity of said motor drive to the power delivered by said act of generating said high DC voltage is between 0.001 hours and 60 hours.

18. The method of claim 17 wherein a ratio of the energy storage capacity of said motor drive to the power delivered by said act of generating said high DC voltage is between 0.5 hours and 20 hours.

19. The method of claim 17 further comprising generating a cranking voltage from said low DC voltage during cranking operation of said alternator.

20. The method of claim 19 wherein said act of generating a cranking voltage further comprises boosting said alternating voltage.

21. The method of claim 17 further comprising converting said low DC voltage to a utility voltage.

22. The method of claim 21 further comprising selectively converting said utility voltage to said low DC voltage.

23. The method of claim 17 further comprising converting said high DC voltage to a utility voltage.

24. The method of claim 23 further comprising selectively converting said utility voltage to said high DC voltage.

25. The method of claim 17 further comprising:
selectively generating a cranking voltage or a utility voltage from said low DC voltage; and
selectively coupling said cranking voltage to said alternator or said utility voltage to a utility grid.

26. The method of claim 25 wherein said act of selectively generating a cranking voltage or a utility voltage further comprises boosting said alternating voltage.

27. The method of claim 17 further comprising:
selectively generating a cranking voltage or a utility voltage from said high DC voltage; and
selectively coupling said cranking voltage to said alternator or said utility voltage to a utility grid.

28. The method of claim 17 wherein said act of generating a high DC voltage further comprises:
storing and delivering electrical energy derived from said low DC voltage using an ultracapacitor bank; and
controlling energy flows among said rectifier, said energy battery, and said ultracapacitor bank.

29. The method of claim 28 further comprising conducting current unidirectionally from said energy battery to said ultracapacitor bank.

30. The method of claim 17 wherein said act of producing said tractive effort from said motor voltage further comprises storing and delivering energy derived from said high DC voltage using a power ultracapacitor.

31. The method of claim 17 wherein said motor voltage is a DC voltage.

32. The method of claim 17 wherein said act of generating said high DC voltage further comprises supplying power to auxiliary loads.

33. An apparatus, comprising:
a first battery electrically coupled to an AC/DC rectifier and that is capable of receiving, storing, or receiving and storing a first direct current at a first voltage;
a boost converter electrically coupled to the first battery and that is capable of boosting the first voltage to a second voltage that is a relatively higher voltage than the first voltage; and a second battery electrically coupled to the boost converter, and that is capable of receiving, storing, or receiving and storing the second voltage; and further comprising a an electric utility grid converter coupled to the first battery and that is capable of charging at least one of the first battery or the second battery from an electric utility grid.

34. The apparatus as defined in claim 33, wherein the first battery has a higher energy density than the second battery.

35. The apparatus as defined in claim 33, wherein the first direct current voltage is high voltage.

36. The apparatus as defined in claim 33, wherein the first mode of operation is a motoring operation.

37. The apparatus as defined in claim 33, wherein the second mode of operation is a dynamic braking operation.

38. An apparatus, comprising:
a first battery electrically coupled to an AC/DC rectifier and that is capable of receiving, storing, or receiving and storing a first direct current at a first voltage;

a boost converter electrically coupled to the first battery and that is capable of boosting the first voltage to a second voltage that is a relatively higher voltage than the first voltage; and a second battery electrically coupled to the boost converter, and that is capable of receiving, storing, or receiving and storing the second voltage; and further comprising an electric utility voltage converter coupled to the first battery and that is capable of supplying electricity.

\* \* \* \* \*